(12) United States Patent
Moulios et al.

(10) Patent No.: US 7,769,189 B1
(45) Date of Patent: Aug. 3, 2010

(54) PRESERVING NOISE DURING EDITING OF A SIGNAL

(75) Inventors: Christopher J. Moulios, Cupertino, CA (US); Nikhil M. Bhatt, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1383 days.

(21) Appl. No.: 11/104,995

(22) Filed: Apr. 12, 2005

(51) Int. Cl.
*H04B 15/00* (2006.01)
*G06F 17/00* (2006.01)

(52) U.S. Cl. ............... 381/94.7; 381/94.1; 700/94
(58) Field of Classification Search ........... 381/71.1, 381/73.1, 93, 94.1–94.9, 57, 56; 700/94; 330/51
See application file for complete search history.

(56) References Cited

U.S. PATENT DOCUMENTS

| | | | |
|---|---|---|---|
| 3,696,401 A | 10/1972 | Vance | |
| 3,932,888 A | 1/1976 | Lemke et al. | |
| 4,941,035 A | 7/1990 | Judge | |
| 5,113,252 A | 5/1992 | Horie et al. | |
| 5,450,132 A | 9/1995 | Harris et al. | |
| 5,537,530 A | 7/1996 | Edgar et al. | |
| 5,649,050 A | 7/1997 | Hardwick et al. | |
| 5,752,224 A | 5/1998 | Tsutsui et al. | |
| 5,758,020 A | 5/1998 | Tsutsui | |
| 6,088,455 A | 7/2000 | Logan et al. | |
| 6,148,175 A | 11/2000 | Freedland | |
| 6,232,540 B1 | 5/2001 | Kondo | |
| 6,266,643 B1 | 7/2001 | Canfield et al. | |
| 6,298,482 B1 | 10/2001 | Seidman et al. | |
| 6,337,947 B1 | 1/2002 | Porter et al. | |
| 7,055,166 B1 | 5/2006 | Logan et al. | |
| 7,424,677 B2 | 9/2008 | Sezan et al. | |
| 7,454,010 B1 * | 11/2008 | Ebenezer | 379/392.01 |
| 2002/0028060 A1 | 3/2002 | Murata et al. | |
| 2002/0188602 A1 | 12/2002 | Stubler et al. | |
| 2003/0014135 A1 | 1/2003 | Moulios | |
| 2003/0067554 A1 | 4/2003 | Klarfeld et al. | |
| 2003/0084065 A1 | 5/2003 | Lin et al. | |
| 2004/0189827 A1 | 9/2004 | Kim et al. | |
| 2004/0199277 A1 | 10/2004 | Bianchi et al. | |

OTHER PUBLICATIONS

Higgins, D., "Wave Corrector v3.0 Vinyl/Tape to CD-R Processing Digital Audio Editing for the PC User Manual," Jul. 22, 2004, Ganymede Test & Measurement, v3.0, from < http://web.archive.org/web/20040722132002/www.wavecor.co.uk/help300.pdf > (86 pgs).

* cited by examiner

*Primary Examiner*—Vivian Chin
*Assistant Examiner*—Douglas J Suthers
(74) *Attorney, Agent, or Firm*—Hickman Palermo Truong & Becker LLP; Adam C. Stone

(57) ABSTRACT

Techniques for introducing background noise segments into signal data are provided. The background noise segments are constructed from a background noise print extracted from the signal data. The background noise print may be user specified, or automatically identified by the signal editing tool. The background noise print may be stored with, and subsequently loaded as part of, the project associated with a signal. The background noise segments that are generated based on the background noise print may have different durations than the background noise print itself.

34 Claims, 8 Drawing Sheets

PRESERVING NOISE DURING EDITING OF A SIGNAL

FIELD OF THE INVENTION

The present invention relates to editing digital information that represents a signal that contains noise and, more specifically, to preserving noise during editing of such digital information.

BACKGROUND

Most signals that are recorded from real-world measurements contain some form of noise. In the context of audio signals, the "noise" reflected in a recording is usually the result of ambient noise in the environment in which the recording was made. In an office environment, such noise may result from HVAC systems, distant traffic, the hum of electrical equipment, etc. In a natural environment, such noise may be the result of wind, birds, flowing water, etc. The real-world rarely, if ever, achieves a state of absolute silence.

The digital representation of a signal is referred to herein as "signal data". For a variety of reasons, it may be desirable to edit the signal data that is produced by recording a signal. For example, in the context of audio signals, it may be desirable to edit the audio recording of a presentation to remove from the recording the sound of a cough during an otherwise quiet period. To remove the cough without changing the relative timing of the audio recording, the segment of the signal data that contains the audio representation of the cough can be replaced with data that represents silence. However, such an edit would introduce a transition from quiet (with ambient noise) to absolute silence, and then from absolute silence back to quiet. Such transitions will sound unnatural to listeners.

For the purpose of illustration, the examples given herein are in the context of edit operations performed on data that represents audio signals. However, the techniques described hereafter are applicable to any situation in which a signal with background noise is edited.

Referring to FIG. 1, it is a block diagram that depicts a user interface 100 of an audio editing program. The user interface 100 visually depicts a recorded signal as a graph of signal amplitude over time. In the illustrated example, two signals are depicted. The two signals correspond to the left and right channels of a two-channel recording.

As evident by the depiction in FIG. 1, the recorded audio includes periods of relatively high amplitude, and periods of relatively low amplitude. The periods of relatively low amplitude are periods in which only background noise was recorded. The periods of relatively high amplitude are periods in which "foreground information" was recorded.

As used herein, the term "foreground information" refers to any information contained in the signal that is not considered background noise. What constitutes the "foreground information" for any given recording may vary from context to context. For example, the foreground information of a recorded speech may be the portion of the signal in which the speaker is actually speaking.

Referring to FIG. 2, it represents the user interface of FIG. 1 after a user has replaced a segment of the recorded signal with data that represents absolute silence. A user may edit the audio in this manner, for example, in an attempt to delete the sound of a cough during a pause in a recorded speech. Due to the insertion of the silent segment, the audio transitions from ambient noise, to silence, back to ambient noise.

As previously mentioned, such transitions sound unnatural to the listener. Specifically, in the case of an audio signal, the blank data is a noticeable discontinuity. It sounds like a "drop-out" and draws attention to the edit. It is desirable to allow users to edit signal data without introducing such unnatural transitions.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Noise Buffer

To avoid transitions to and from absolute silence, techniques are described herein for storing, within a "noise buffer", data that represents background noise. Such data shall be referred to herein as "background noise print". Once the background noise print has been stored in the noise buffer, the user of the signal editing tool may replace portions of the signal data with "background noise segments", rather than silent segments. The background noise segments are automatically generated by the signal editing tool based on the background noise print contained in the noise buffer. As shall be described in greater detail hereafter, the duration of the signal that is represented in the background noise segments need not be the same as the duration of the signal that is represented in the background noise print.

Filling the Noise Buffer

Figure 1:
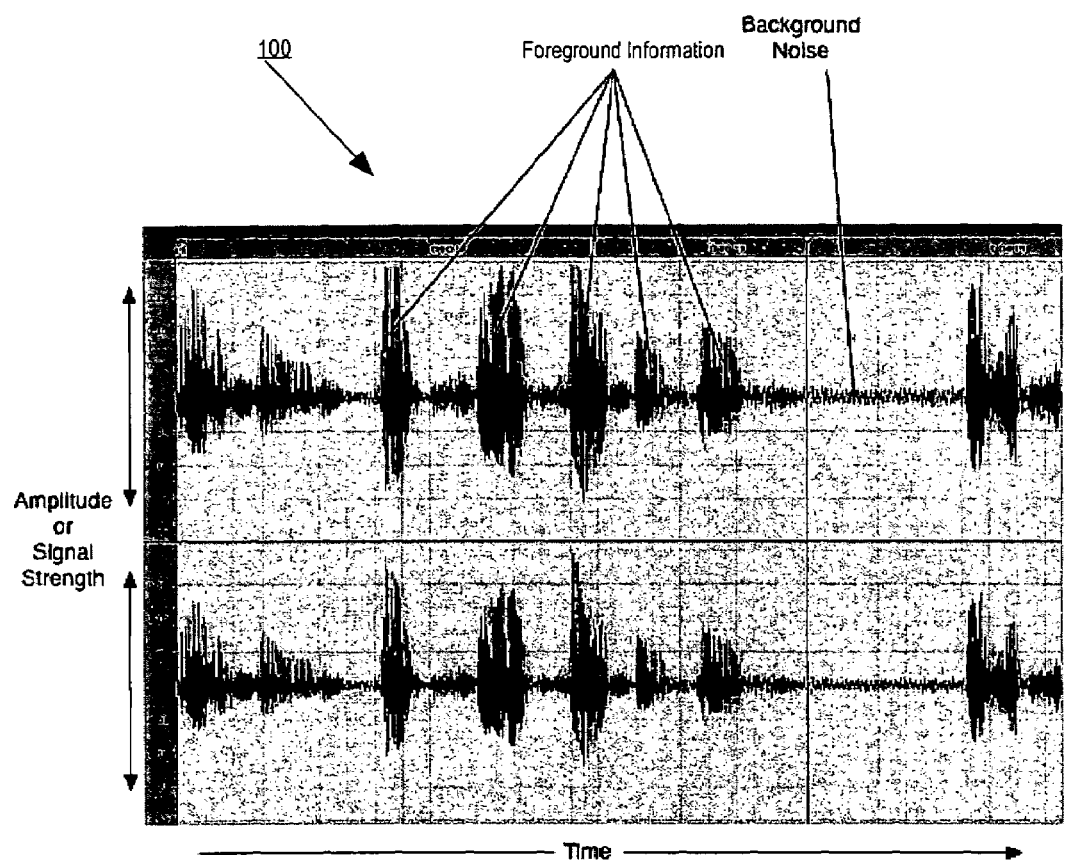
FIG. 1 is a block diagram of a portion of the user interface of a signal editing tool that visually depicts an audio signal in a graph of amplitude over time.
Figure 2:
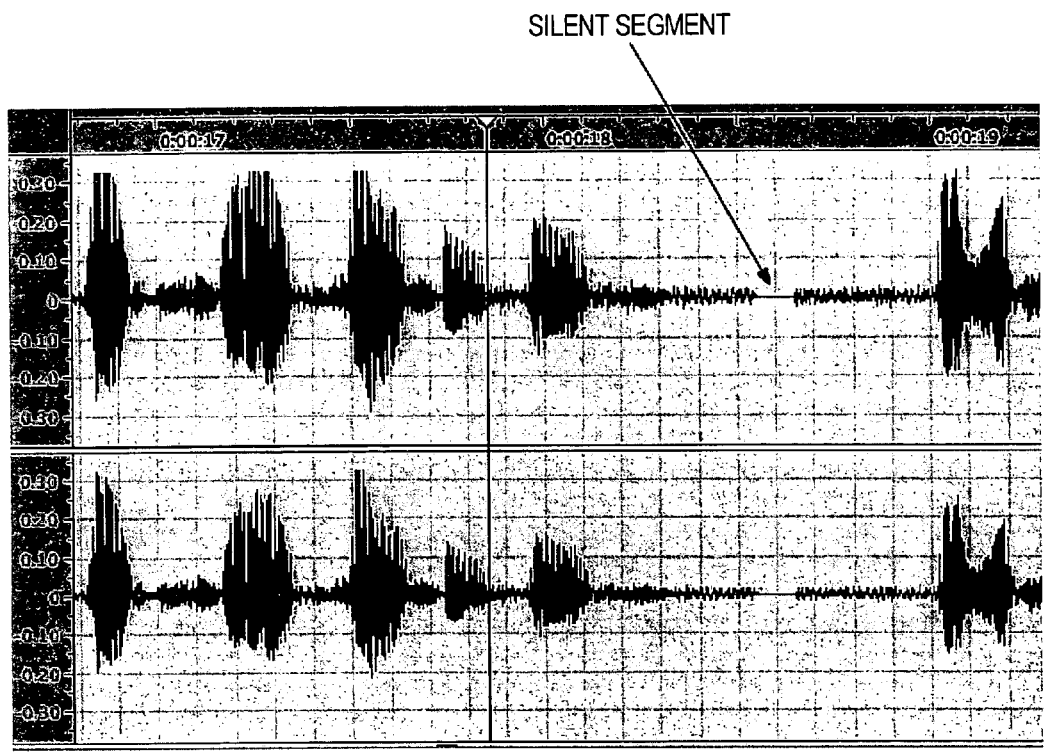
FIG. 2 is a block diagram of the user interface depicted in FIG. 1, where a portion of the signal has been overwritten with a silent segment.
Figure 3:
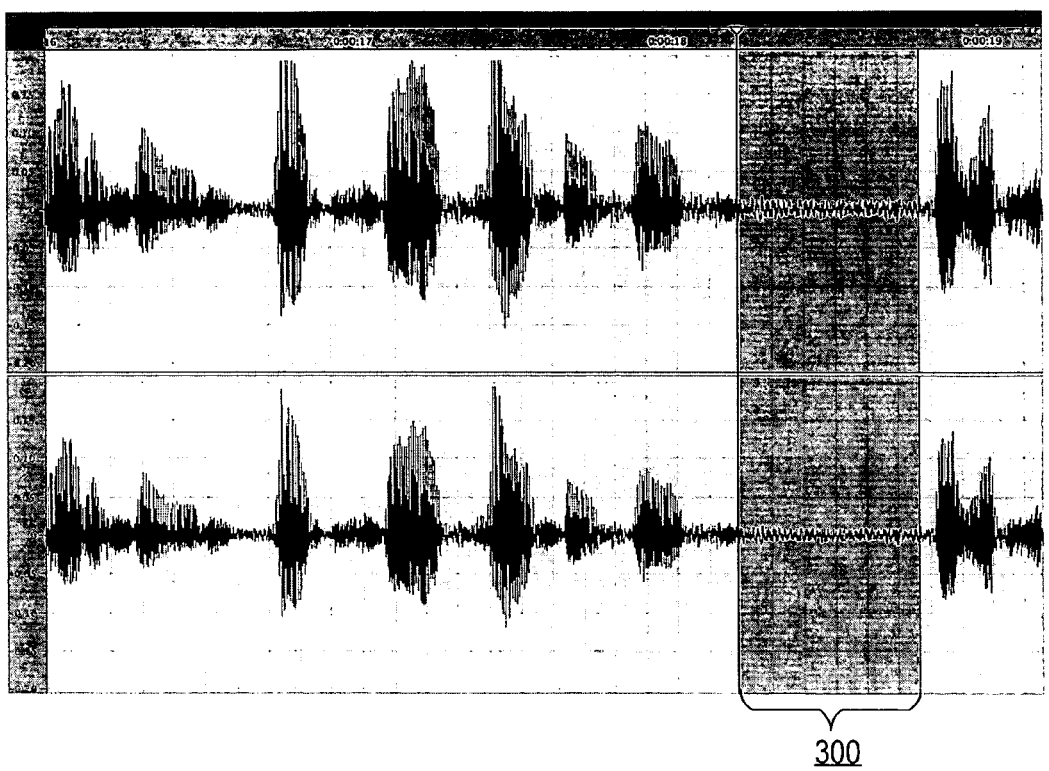
FIG. 3 is a block diagram illustrating a user interface that visually depicts selection of a range corresponding to a portion of a signal, according to an embodiment of the invention.

According to one embodiment of the invention, the signal editing tool provides controls that allow a user of the tool to manually specify the portion of the signal data from which to obtain the background noise print. For example, in FIG. 3 a user has selected a range of time 300 in the graph that visually depicts the signal.

The manual selection of the range may be performed in a variety of ways. For example, the user may push the button of a mouse when the cursor is at one boundary of the desired range, and then drag the cursor to the other boundary of the desired range. Once the cursor is at the second boundary of the desired range, the user may release the mouse button, thereby establishing the signal between the two boundaries as the selected portion of the signal. Alternatively, the user may click to establish a start marker, click to establish an end marker, and then activate a control that causes the range between the markers to be selected. There is virtually no limit to the ways that a tool may allow a user to select a range of a signal, and the techniques described herein are not limited to any such selection technique.

Once the desired range has been identified, the user selects a control that causes the signal data that corresponds to the selected range to be copied into the noise buffer. According to one embodiment, the signal editing tool has a menu item labeled "Process". When Process menu item is selected, the user is presented with a list of selectable commands. One of the selectable commands is "Set Background Noise Print". In response to user selection of the "Set Background Noise Print" command, the signal editing tool copies the signal data that corresponds to the currently selected range into the noise buffer.

Selecting a "Set Background Noise Print" command from a menu is merely one example of an input mechanism for causing the data associated with a selected range to be copied into the noise buffer. Any number of alternative input techniques may be used to cause the data to be copied into the noise buffer. For example, the signal editing tool may have a "Set Background Noise Print" button which, when activated, causes the selected data to be copied to the noise buffer.

In the foregoing examples, a range is selected first, and then the user specifies that the selected range is to be used for the background noise print. However, the sequence of those actions may be reversed. For example, the signal editing tool may be designed to allow the user to select a "Select Background Noise Print" control first, and then select a range for the background noise print. In such an embodiment, when the user finishes selecting a range, the data associated with the range is automatically copied to the noise buffer.

Instead of or in addition to a mechanism that allows a user to manually specify the portion of the signal to use as the background noise print, a signal editing tool may have a mechanism for automatically identifying and selecting a portion of the signal to use as the background noise print. The techniques used by such a mechanism to identify the background noise print may vary from implementation to implementation, and the invention is not limited to any particular technique. For example, one implementation may analyze the signal data to identify a segment that (1) exceeds a threshold duration, and (2) stays below a threshold amplitude. Upon identifying such a segment, the signal editing tool would copy the signal data that corresponds to that segment into the noise buffer.

Using the Background Noise Print

Many editing operations supported by a signal editing tool may result in blank data being inserted into the signal data. For example, a signal editing tool may provide controls that allow the user to "blank out" a selected portion of the signal, such as the portion of a recorded speech that contains a cough. As another example, the signal editing tool may provide controls for inserting blank data, of a user-specified duration, at a user-specified point in the recorded signal. Such an operation would be useful, for example, to increase the dramatic pause after an emphatic pronouncement in a speech. These are merely two examples of signal editing operations that result in blanked out data being inserted into the signal data. The techniques described herein are not limited to any particular set of such operations.

According to one embodiment, the signal editing tool uses the background noise print in the noise buffer to automatically insert into the signal data a background noise segment whenever the user performs an operation that requires the insertion of blank data into the signal. Because the background noise segment is generated based on the background noise print, the noise reflected in the background noise segment will have the same characteristics as the background noise of the original signal. Consequently, the transition from the original signal to and from the background noise segment will sound much more natural than would result from using a 0.0 signal, or a signal with some other default value.

In-Project Storage of Background Noise Print

Typically, the set of files associated with a recorded signal are collectively treated as a "project" by signal editing tools. One file within a project associated with a signal may, for example, be the file that contains the signal data that represents the signal. Another file within the project may include data that identifies all other files that belong to the project. Signal editing tools typically have the ability to load and store all such related files on a project by project basis.

According to one embodiment, the signal editing tool includes a mechanism for storing and loading, as part of a project, the background noise print that has been established for the signal associated with the project. Specifically, when a project is stored, the contents of the noise buffer are stored to persistent storage as part of a file associated with the project. Conversely, when a project is loaded, the background noise print is read from the persistent storage and loaded into a noise buffer allocated in volatile memory. Alternatively, the loading of the background noise print can be delayed until the user actually performs an editing operation that requires the generation of a background noise segment.

Forming and Inserting a Background Noise Segment

As mentioned above, the signal editing tool inserts background noise segments into the signal data in response to operations that require the insertion of blank data into the signal. The duration of such background noise segments is dictated by how much "blank" has to be inserted into the signal, and not by the duration of the background noise print in the noise buffer. Consequently, according to one embodiment, the signal editing tool has a mechanism for generating background noise segments of any required duration, regardless of the duration of the background noise print.

Figure 4:
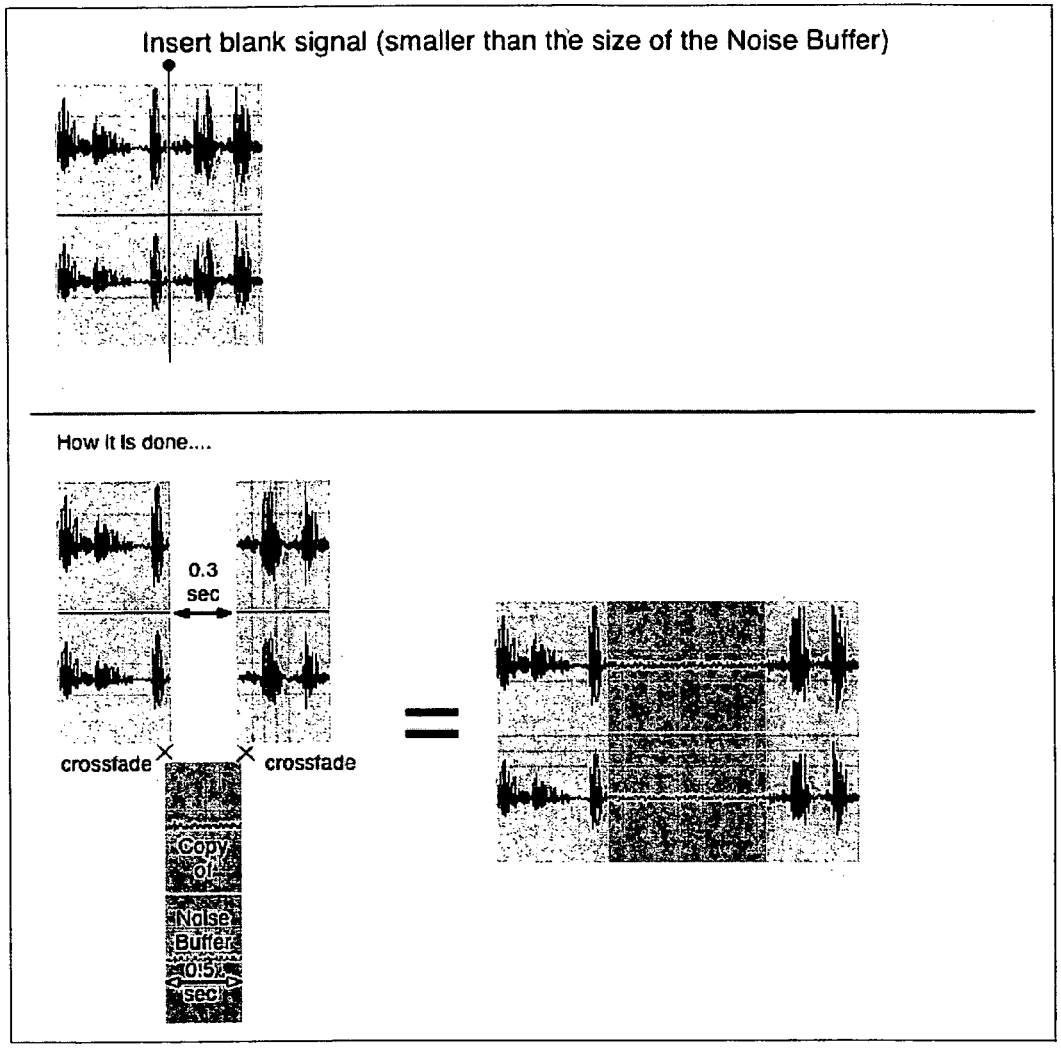
FIG. 4 is a block diagram illustrating the insertion of a background noise segment into signal data, where the inserted background noise segment is of shorter duration than the background noise print.

The signal editing tool may use a variety of techniques to generate the background noise segments based on the background noise print. For example, FIG. 4 illustrates scenario where the background noise print has a duration (0.5 seconds) that is greater the duration of the required background noise segment (0.3 seconds). In this example, the signal editing tool copies a subset of the background noise print, where the subset has a duration (0.3 seconds) equal to the "blank" that needs to be inserted. The subset is then inserted into the signal data at the appropriate location. To make the transition between the original signal and the background noise segment less noticeable, the signal editing tool may automatically crossfade the beginning and the end of the background noise segment with the signal adjacent to the point at which the background noise segment is inserted.

Figure 5:
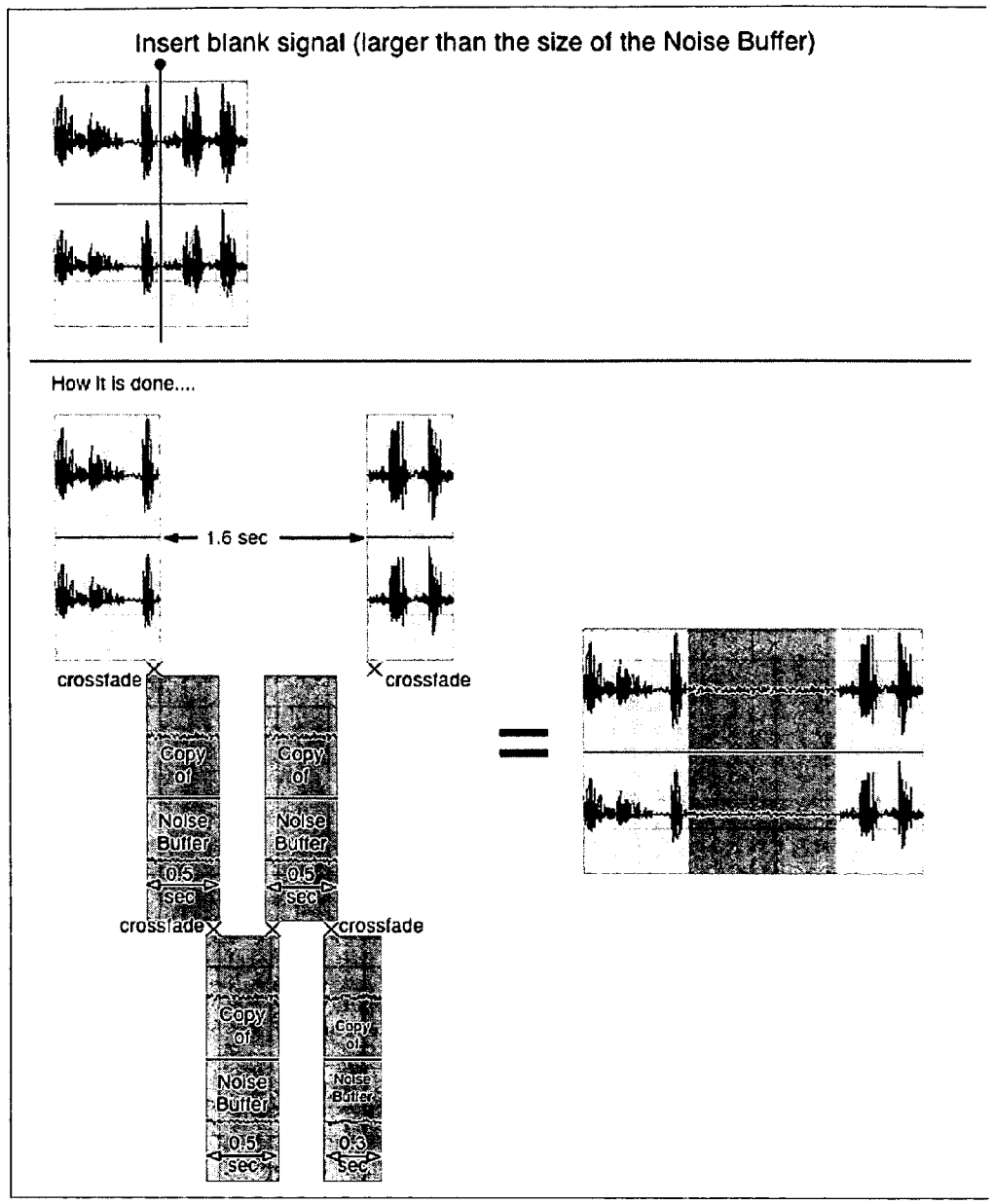
FIG. 5 is a block diagram illustrating the insertion of a composite background noise segment into signal data, where the composite background noise segment is of longer duration than the background noise print.

Referring to FIG. 5, it illustrates a scenario in which the edit operation requires insertion of a background noise segment that has a greater duration than the background noise print. In the illustrated example, the signal editing tool constructs a "composite" background noise segment by concatenating multiple constituent background noise segments, where each of the constituent background noise segments is a copy of all or a subset of the background noise print. According to one embodiment, the ends of the constituent background noise segments are automatically crossfaded during the construction of the composite background noise segment. In addition, the ends of the composite background noise segment are crossfaded with the signal adjacent to the point at which the composite background noise segment is inserted.

Figure 6:
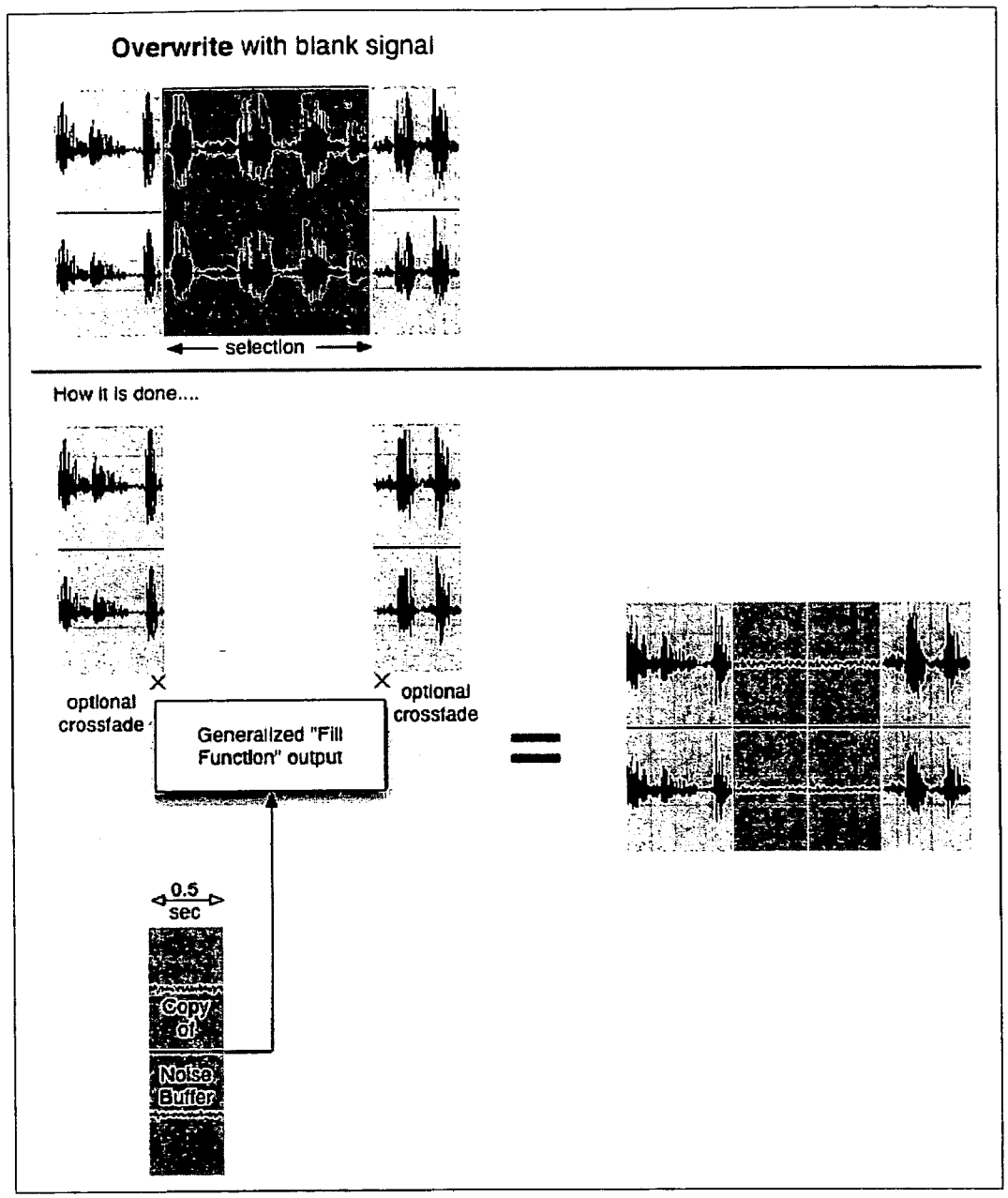
FIG. 6 is a block diagram illustrating the insertion of a simulated background noise segment into signal data, where the simulated background noise segment is of longer duration than the background noise print.

FIG. 6 illustrates an alternative technique for generating a background noise segment that is longer than the background noise print. Specifically, a "fill function" may be used to synthesize a background noise segment based on the content of the background noise print. The fill function may, for example, analyze the background noise print to identify the characteristics of the noise represented therein, and then generate simulated signal data that reflects those characteristics. The simulated signal data thus generated is then inserted, and crossfaded with the adjacent signal data.

Overwriting Operations

As mentioned above, numerous types of edit operations may require the insertion of blank data into the signal data. One such type of edit operation is an overwrite operation. An overwrite operation is similar to a simple insert operation except that an overwrite operation deletes a portion of the original signal before inserting a blank signal that is of equal duration with the amount of original signal that was deleted. FIG. 6 is a block diagram that illustrates how a signal editing tool may perform an overwrite operation, according to an embodiment of the invention.

According to one embodiment, the user uses the user interface controls of the signal editing tool to specify the portion of the signal to be overwritten, and the signal editing tool automatically replaces the signal data that corresponds to the specified portion of the signal with a background noise segment generated based on the background noise print. The specific user interface controls for specifying the portion of the signal that is to be overwritten may vary from implementation to implementation. For example, the user may use controls to specify boundaries of a range, or may use a "paintbrush" tool to "paint over" portions of the signal to cause those portions to be replaced by background noise segments.

To facilitate the use of such a paintbrush tool, the signal editing tool may have controls that allow the user to exclude from modification one or more sections of the signal. While excluded in this manner, the sections are protected from change, even if the user accidentally drags the paintbrush tool into such sections.

Time Stretch Operations

Figure 7:
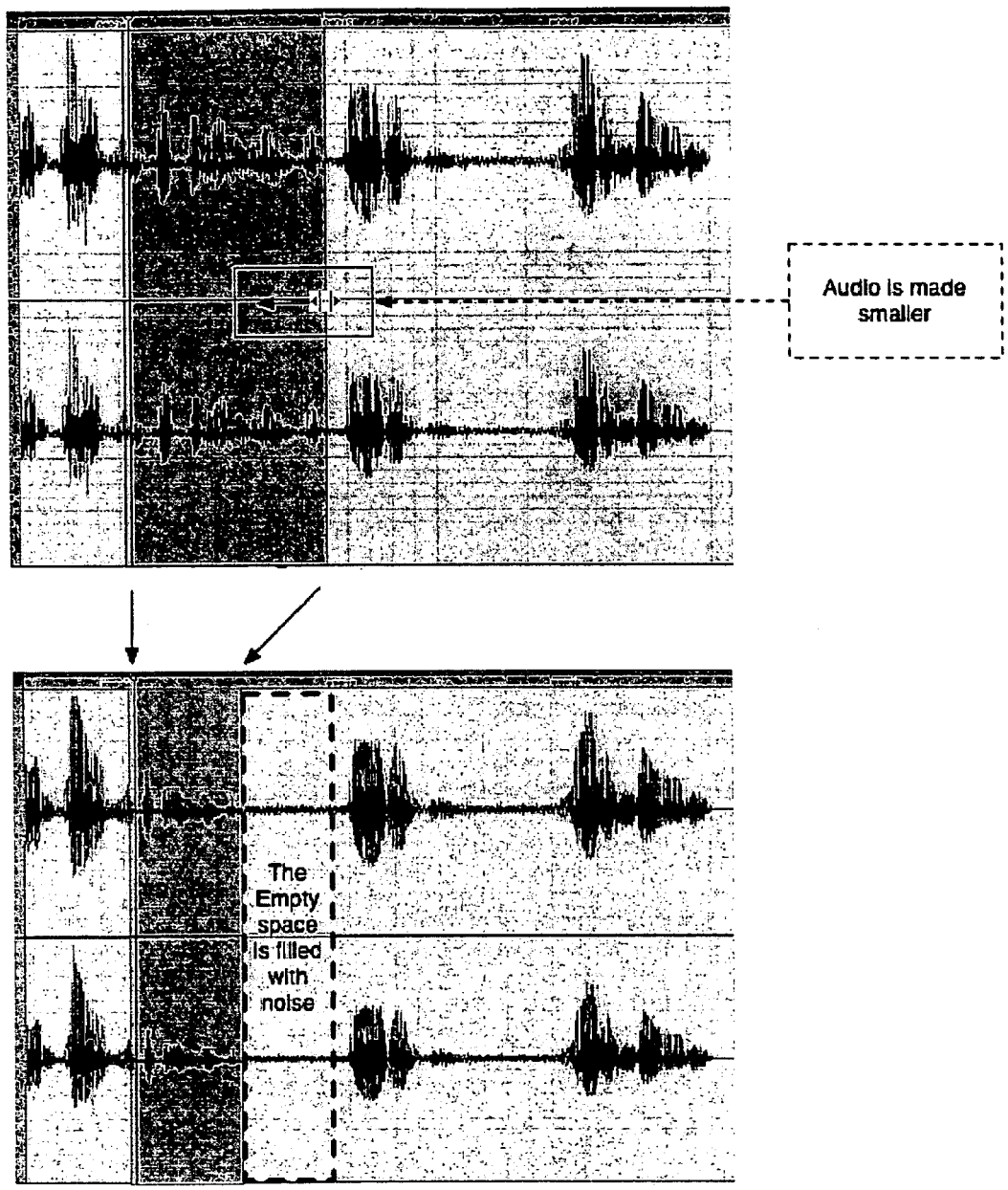
FIG. 7 is a block diagram illustrating the automatic insertion of a background noise segment in response to and editing operation that shrinks a portion of the original signal.

Another editing operation that may require the insertion of blank data is a time stretch function in which (1) the duration of a portion of the audio is made shorter, but (2) the duration of the entire signal is maintained constant. When performing this operation, it is often useful to add "room tone" to backfill the space being removed, and therefore maintain sound synchronization with other time based events, like video playback. FIG. 7 is a block diagram that illustrates how a signal editing tool may perform a time stretch operation, according to an embodiment of the invention.

Find Silence Operations

In some of the examples given above, the signal editing tool automatically inserts noise segments when an editing operation would otherwise result in the introduction into the signal of a blank (silent) segment. Instead of or in addition to such functionality, the signal editing tool may use the background noise print to replace previously-introduced silent segments with background noise segments. For example, in response to user input, the signal editing tool may analyze the signal to identify any segments that qualify as "silence", and automatically replace such segments with background noise segments constructed based on the background noise print.

Mix and Add Operations

Another editing operation that may require the insertion of background noise is a "mix" or "add" operation in which the background noise is "mixed" into the existing signal. Mixing the background noise (constructed based on the background noise print) into the existing signal is useful when a section of the signal contains information (such as speech), but lacks background noise. In contrast, the overwrite operation discussed above is useful when the selected section of the signal contains no useful information and can be replaced.

Adding the Background Noise of One Signal to Another Signal

In the examples given above, the background noise print extracted from a signal is used in response to editing operations performed on the same signal. However, it may also be useful to take the background noise print from one signal and apply it to a different signal. For example, if signal A is recorded outdoors and signal B is recorded in an isolated room, then the outdoor noise could be captured from A and mixed into signal B. The result is a modified signal B that sounds as if it was recorded outdoors as well.

Hardware Overview

Figure 8:
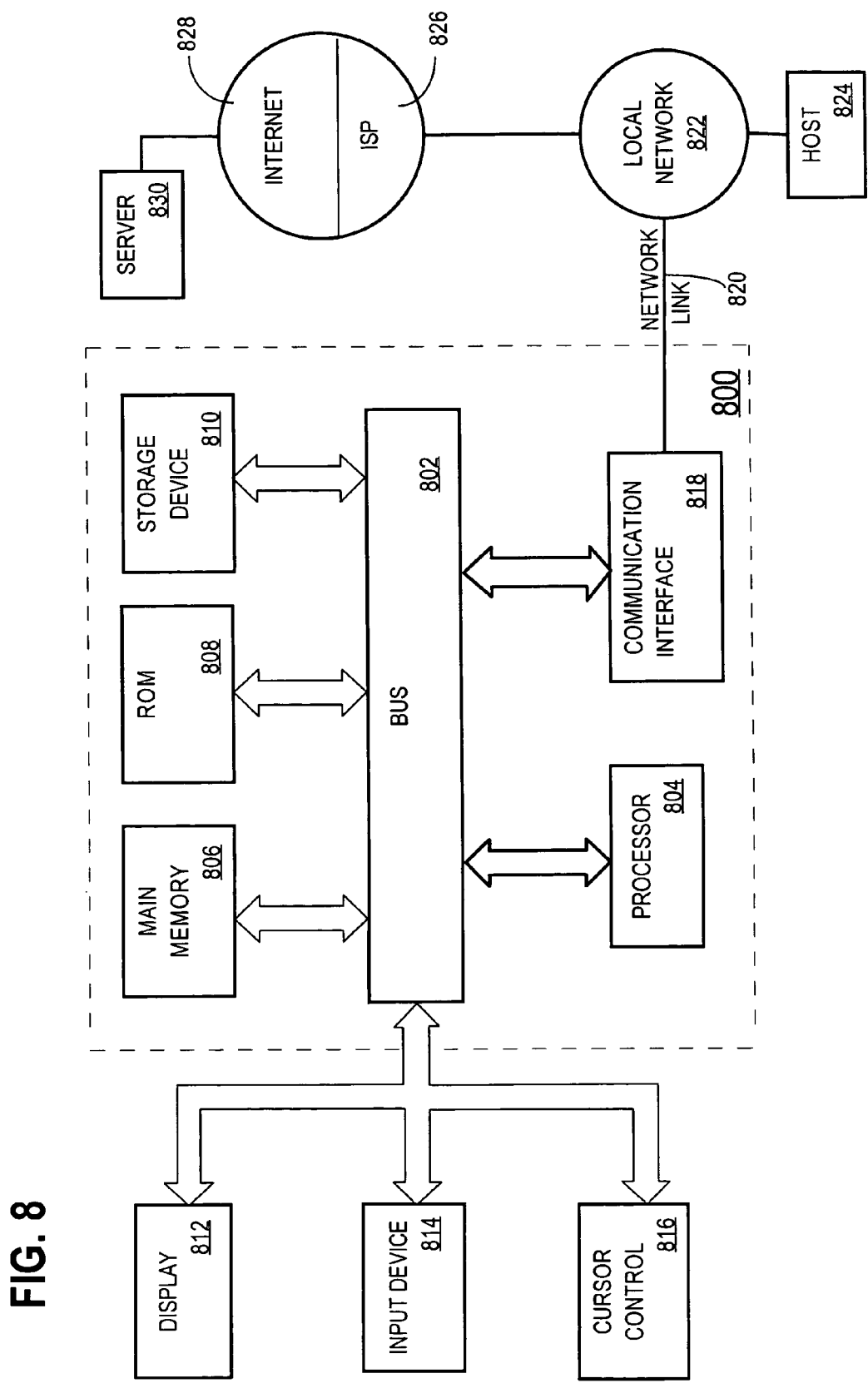
FIG. 8 is a block diagram of a computer system on which embodiments of the invention may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM)

or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 800, various machine-readable media are involved, for example, in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of editing signal data that represents an audio signal, wherein the audio signal includes background noise and foreground information, the method comprising:
storing, within a noise buffer, a background noise print;
wherein the background noise print is a copy of a portion of the signal data;
wherein said portion corresponds to a time period in which the audio signal contains background noise and substantially no foreground information; and
based on the background noise print, modifying the signal data to introduce into the audio signal a segment that contains noise and substantially no foreground information;
wherein the background noise print and the segment have different durations;
wherein the step of modifying the signal data is performed in response to an operation specified by user input received through a graphical user interface that edits the signal data;
wherein the method is performed by one or more computing devices.

2. The method of claim 1 wherein the step of modifying the signal data includes mixing the segment that contains noise and substantially no foreground information with an existing segment that contains foreground information.

3. The method of claim 1 wherein:
said audio signal is a first audio signal;
said signal data is first signal data;
the method further comprises, based on the background noise print, modifying second signal data to introduce into a second audio signal a segment that contains noise and substantially no foreground information from the first audio signal;
the second audio signal is a different signal than the first audio signal; and
the second signal data is different signal data than the first signal data.

4. The method of claim 1 wherein:
the signal data represents audio recorded in a particular environment; and
the background noise is ambient noise of the particular environment.

5. The method of claim 1 further comprising:
receiving user input that identifies said time period; and
determining which portion of the signal data to store in said noise buffer based on said user input.

6. The method of claim 1 further comprising:
performing an automated analysis of the signal data to identify the portion of the audio signal data that represents the audio signal during a time period in which the audio signal contains background noise and substantially no foreground information; and
determining which portion of the signal data to store in said noise buffer based on said automated analysis.

7. The method of claim 1 wherein:
the segment is a composite segment that is longer than the background noise print; and
the method includes forming the composite segment from multiple constituent segments extracted from said background noise print.

8. The method of claim 7 wherein the step of forming the composite segment includes crossfading each constituent segment with each adjacent constituent segment.

9. The method of claim 1 wherein:
the segment is a simulated segment that is longer than the background noise print; and
the method includes creating the simulated segment by determining characteristics of noise in the audio signal based on the background noise print; and
generating the simulated segment based on the characteristics.

10. The method of claim 1 wherein the segment is shorter than the background noise print.

11. The method of claim 1 wherein the step of modifying the signal data includes, in response to introducing the segment into the audio signal, automatically performing at least one of:
crossfading the start of the segment with a portion of the audio signal that precedes the segment, and
crossfading the end of the segment with a portion of the audio signal that follows the segment.

12. The method of claim 1 wherein the operation is an insert operation to insert blank data at a particular point in the audio signal.

13. The method of claim 1 wherein the operation is an overwrite operation that replaces a portion of the signal data with blank data.

14. The method of claim 1 wherein the operation is a time stretch operation that shrinks a portion of the audio signal without shrinking the overall duration of the audio signal.

15. The method of claim 1 further comprising storing, to persistent storage, the background noise print as part of a project associated with the audio signal.

16. The method of claim 15 further comprising loading, from the persistent storage to volatile memory, the background noise print as part of the project associated with the audio signal.

17. The method of claim 1 wherein the step of modifying the audio signal is performed automatically as part of an operation that:
identifies a silent segment in the audio signal; and
replaces the silent segment with said segment.

18. A computer-readable storage medium storing one or more sequences of instructions which, when executed by one or more processors, causes the one or more processors to perform the method recited in claim 1.

19. A computer-readable storage medium storing one or more sequences of instructions which, when executed by one or more processors, causes the one or more processors to perform the method recited in claim 2.

20. A computer-readable storage medium storing one or more sequences of instructions which, when executed by one or more processors, causes the one or more processors to perform the method recited in claim 3.

21. A computer-readable storage medium storing one or more sequences of instructions which, when executed by one or more processors, causes the one or more processors to perform the method recited in claim 4.

22. A computer-readable storage medium storing one or more sequences of instructions which, when executed by one or more processors, causes the one or more processors to perform the method recited in claim 5.

23. A computer-readable storage medium storing one or more sequences of instructions which, when executed by one or more processors, causes the one or more processors to perform the method recited in claim 6.

24. A computer-readable storage medium storing one or more sequences of instructions which, when executed by one or more processors, causes the one or more processors to perform the method recited in claim 7.

25. A computer-readable storage medium storing one or more sequences of instructions which, when executed by one or more processors, causes the one or more processors to perform the method recited in claim 8.

26. A computer-readable storage medium storing one or more sequences of instructions which, when executed by one or more processors, causes the one or more processors to perform the method recited in claim 9.

27. A computer-readable storage medium storing one or more sequences of instructions which, when executed by one or more processors, causes the one or more processors to perform the method recited in claim 10.

28. A computer-readable storage medium storing one or more sequences of instructions which, when executed by one or more processors, causes the one or more processors to perform the method recited in claim 11.

29. A computer-readable storage medium storing one or more sequences of instructions which, when executed by one or more processors, causes the one or more processors to perform the method recited in claim 12.

30. A computer-readable storage medium storing one or more sequences of instructions which, when executed by one or more processors, causes the one or more processors to perform the method recited in claim 13.

31. A computer-readable storage medium storing one or more sequences of instructions which, when executed by one or more processors, causes the one or more processors to perform the method recited in claim 14.

32. A computer-readable storage medium storing one or more sequences of instructions which, when executed by one or more processors, causes the one or more processors to perform the method recited in claim 15.

33. A computer-readable storage medium storing one or more sequences of instructions which, when executed by one or more processors, causes the one or more processors to perform the method recited in claim 16.

34. A computer-readable storage medium storing one or more sequences of instructions which, when executed by one or more processors, causes the one or more processors to perform the method recited in claim 17.

\* \* \* \* \*